W. O. STARK.
BRAKE SHOE.
APPLICATION FILED OCT. 7, 1908.

918,605.

Patented Apr. 20, 1909.
4 SHEETS—SHEET 1.

Witnesses:
L. Knudsen
A. S. Peterson

Inventor:
William O. Stark,
By Michael J. Stark & Sons
Attorneys.

W. O. STARK.
BRAKE SHOE.
APPLICATION FILED OCT. 7, 1908.

918,605.

Patented Apr. 20, 1909.
4 SHEETS—SHEET 2.

Witnesses:
E. Knudsen
A. S. Peterson.

Inventor:
William O. Stark
By Michael J. Stark & Sons,
Attorneys.

W. O. STARK.
BRAKE SHOE.
APPLICATION FILED OCT. 7, 1908.
918,605.
Patented Apr. 20, 1909.
4 SHEETS—SHEET 3.
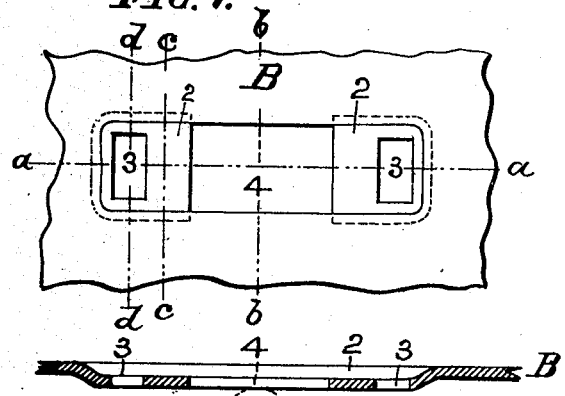
FIG. 7.
FIG. 8.
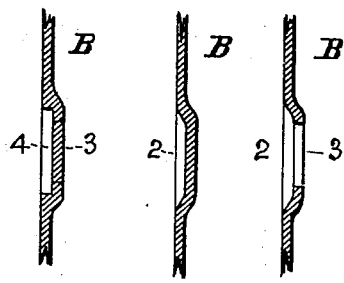
FIG. 9. FIG. 10. FIG. 11.
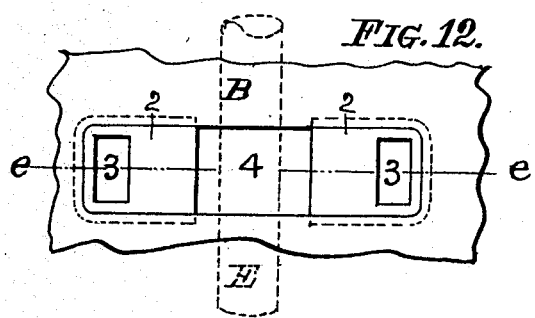
FIG. 12.
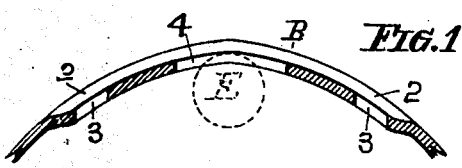
FIG. 13.
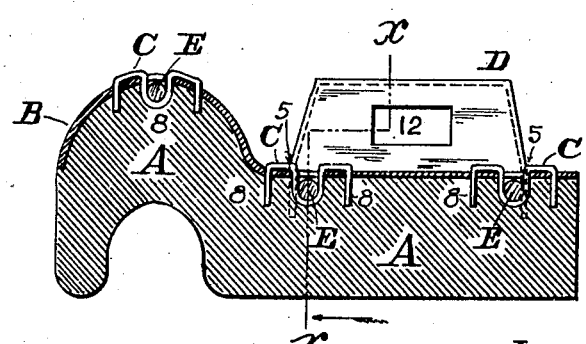
FIG. 14.
Witnesses:
C. Knudsen,
A. G. Peterson.
Inventor:
William O. Stark,
By Michael J. Stark & Sons,
Attorneys.

W. O. STARK.
BRAKE SHOE.
APPLICATION FILED OCT. 7, 1908.

918,605.

Patented Apr. 20, 1909.
4 SHEETS—SHEET 4.

Witnesses:
C. Knudsen
A. J. Peterson.

Inventor:
William O. Stark,
By Michael J. Stark Sons,
Attorneys.

UNITED STATES PATENT OFFICE.

WILLIAM O. STARK, OF CHICAGO, ILLINOIS, ASSIGNOR TO ILLINOIS MALLEABLE IRON COMPANY, OF CHICAGO, ILLINOIS, A CORPORATION OF ILLINOIS.

BRAKE-SHOE.

No. 918,605.  Specification of Letters Patent.  Patented April 20, 1909.

Application filed October 7, 1908. Serial No. 456,565.

*To all whom it may concern:*

Be it known that I, WILLIAM O. STARK, a citizen of the United States, and resident of Chicago, in the county of Cook and State of Illinois, have invented certain new and useful Improvements in Brake-Shoes; and I do hereby declare that the following description of my said invention, taken in connection with the accompanying sheets of drawings, forms a full, clear, and exact specification, which will enable others skilled in the art to which it appertains to make and use the same.

This invention has general reference to brake-shoes as shown in the copending application of Frank T. Dickinson, Serial No. 460,586, filed November 2, 1908, upon which device the present invention is an improvement, and it consists, essentially, in the novel and peculiar combination of parts and details of construction as hereinafter first fully set forth and described, and then pointed out in the claims.

Figure 1:
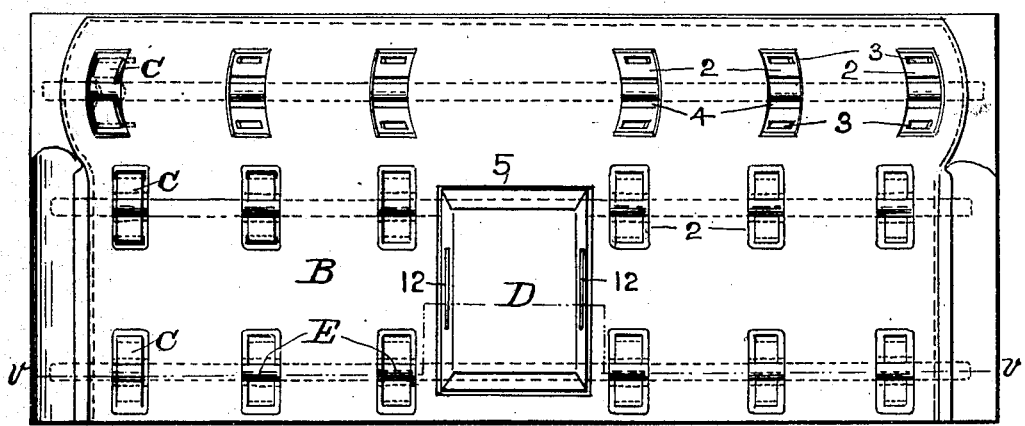
Figure 2:
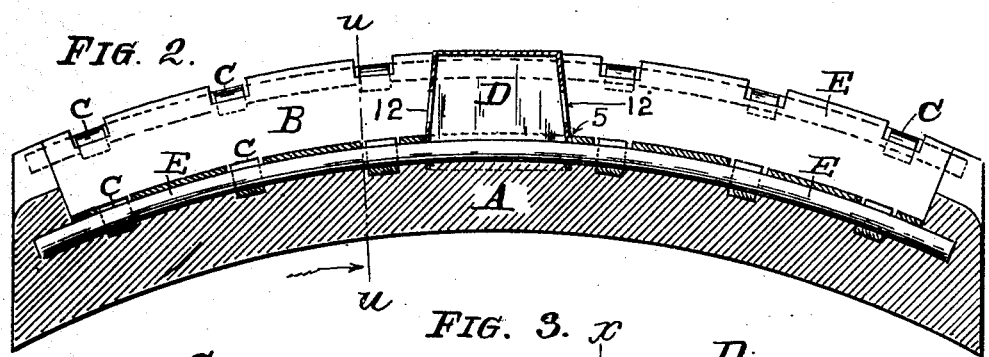
Figure 3:
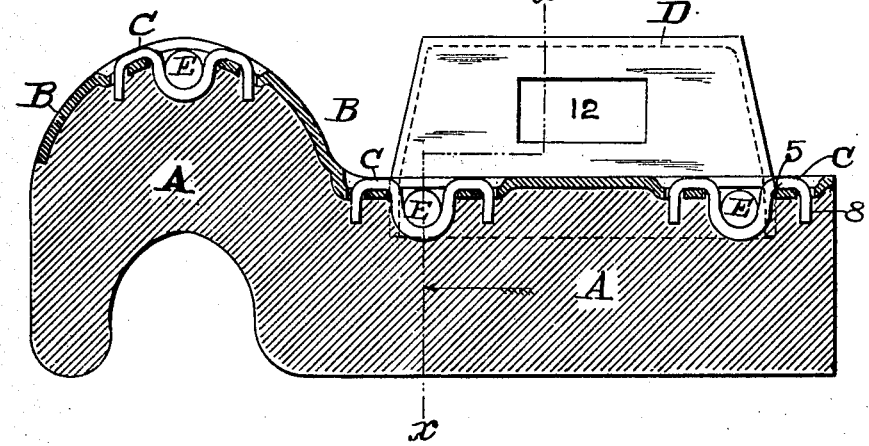
Figure 4:
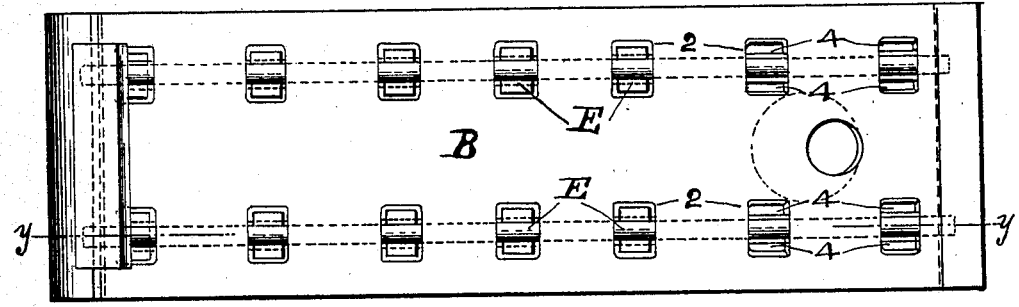
Figure 5:
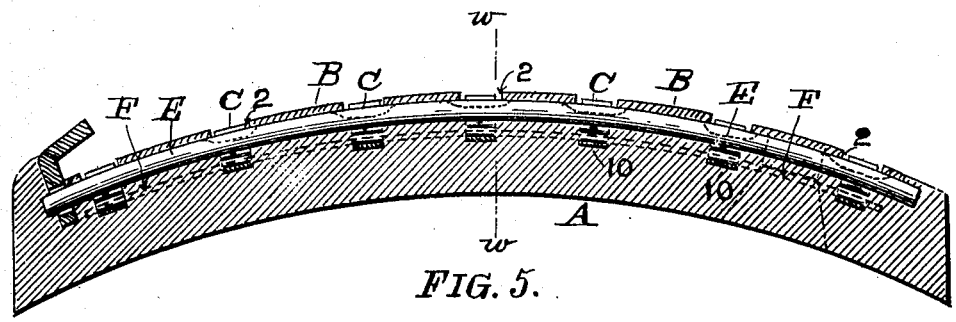
Figure 6:
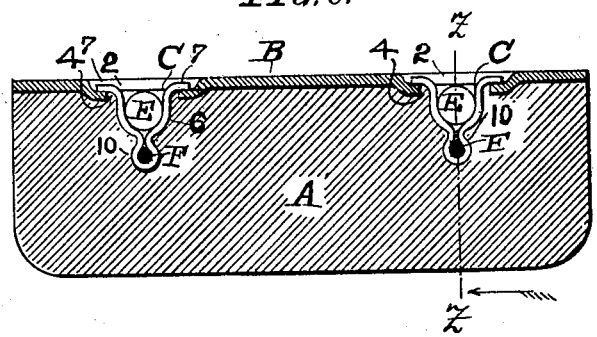
Figure 17:
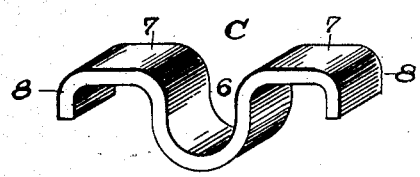

In the drawings already referred to, which serve to illustrate this invention more fully, Figure 1 is a plan of my improved brake-shoe and illustrating a flanged, reinforced, coach shoe. Fig. 2 is a longitudinal sectional elevation of the same taken on line $v\ v$ of Fig. 1, and $x\ x$ of Fig. 3. Fig. 3 is a transverse sectional elevation on line $u\ u$ of Fig. 2. Fig. 4 is a plan of an unflanged brake-shoe usually employed on the intermediary drivers of locomotives, on trolley cars &c., and Fig. 5 a longitudinal sectional elevation of the same, taken on line $y\ y$ of Fig. 4 and $z\ z$ of Fig. 6. Fig. 6 is a transverse section on line $w\ w$ of Fig. 5. Fig. 7 is a plan of a fragment of the reinforcing plate located on the back of the brake-shoe. Fig. 8 is a longitudinal section of the same on line $a\ a$ of Fig. 7. Figs. 9, 10 and 11 are sectional views on line $b\ b$, $c\ c$, and $d\ d$ respectively of Fig. 7. Fig. 12 is a plan of a fragment of that portion of said plate which covers the flange of the shoe, and Fig. 13 is a sectional view in line $e\ e$ of Fig. 12. Fig. 14 is a sectional view of a brake-shoe similar to that shown in Fig. 3, except that the rod-retaining bodies are not located in recesses in the plate. Figs. 15 to 20 inclusive are perspective views of the rod-retaining bodies, and showing various modifications of the same.

Like parts are designated by similar symbols and characters of reference in all the figures.

The object of this invention is the production of a reinforced brake-shoe composed of several metals having different degrees of hardness and tensile strength, whereby a brake-shoe of superior wearing-qualities is produced, and one that can be manufactured at a reasonable cost.

In brake-shoes for steam railway cars, steam, and electric locomotives, electric trolley cars, &c., it is desirable that a brake-shoe shall be so constructed as to wear the longest possible time or to give the greatest brake-shoe mileage. The body of the shoe, being usually of cast metal, is liable to breakage when worn to a certain degree, thereby resulting in considerable loss of wearing-life, and also endangering the rolling stock and the lives of the passengers and the crew, owing to the danger of derailing through broken shoes falling on the track, and accidents resulting in consequence. To avoid these accidents and overcome the objections mentioned, and produce a brake-shoe having a maximum of durability and brake-shoe mileage, I construct this brake-shoe, essentially, of a main body A, of gray iron, chilled iron, chilled or partly chilled cast iron, white iron, steel or compositions of various metals which time and experience has demonstrated to be most desirable for the kind of brake-shoe which it is desired to produce, and the uses to which it is to be put, when in service. This main body may be a flanged shoe, as shown in Figs. 1, 2 and 3, that is to say: a brake-shoe which bears upon the tread of the car-wheel as well as upon the flange of the same; or it may be a plain driver-shoe which in use acts upon the tread of the wheel only, such a shoe being illustrated in Figs. 4, 5 and 6. This body A, being cast from a more or less fragile material, if not reinforced by a more malleable or tougher metal, is liable to break when somewhat worn, and in order to avoid this breakage and to increase its wearing qualities to the longest possible time or brake-shoe mileage, I locate upon the back of this shoe a sheet-metal plate B, which plate will be of substantially the same width and length of the brake-shoe, and when placed into the mold in which the cast portion of the shoe is produced prior to pouring the latter, will practically unite with the cast portion A to form a homogeneous body. In this plate I form, preferably, a series of depressions 2, of oblong contour and suitable depth, and in these depressions I produce oblong apertures 3, for the passage of the reentering lugs, and further oblong apertures 4, for the insertion of the loop-portion of rod-retaining bodies C, hereinafter to be referred to. In the coach-shoe construction I also form, centrally in the plate B a single oblong opening 5, illustrated in Figs. 2, and 3, for the reception of an attaching-lug D, to be hereafter more fully described.

Figure 18:
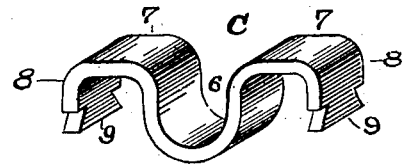
Figure 16:
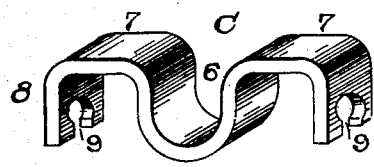
Figure 19:
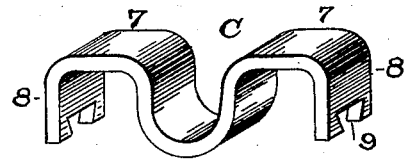
Figure 15:
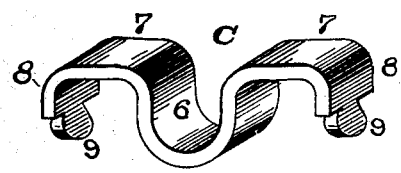
Figure 20:
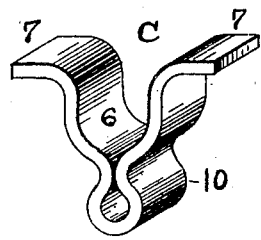

The rod-retaining bodies C are wrought-iron, malleable iron, steel, or other sheet-metal bodies consisting of a loop-portion 6, horizontal members 7, and reëntering lugs 8, the loop-portion being entered into the apertures 4, and the reëntering lugs 8 through the apertures 3 in the said plate B. Into these rod-retaining bodies C there are placed anchoring-rods E, of suitable diameter, said rods being curved or bent to correspond with the curvature of the plate B, and the loops so proportioned that when in position in the plate, the rods E lie approximately close to the under side of said plate, while the horizontal members 7 of said rod-retaining bodies lie within, and flush with, or approximately flush with, the outer surface of the plate B. The reëntering lugs 8 of these rod-retaining bodies C form, as it were, anchors within the body A, and are firmly embedded therein, but if desired, these reëntering lugs 8 may be provided with additional, auxiliary anchors 9, and in Figs. 15 to 20 I have shown various shapes of these auxiliary anchors, thus, in Fig. 15 these auxiliary anchors are shown as consisting of circular projections on the end of said lugs, while in Fig. 16 the auxiliary anchors are illustrated as being circular apertures slotted or notched, as shown. In Fig. 18 I have shown the auxiliary anchors as being of dove-tail contour, being, as it were, in the shape of dove-tail tenons, and in Fig. 19 there is depicted the auxiliary anchor as consisting of a dove-tail shaped excision, all of these various constructions being modifications of the device and equally effective and serviceable for the object in view. In some cases I prefer to further increase the reinforcing of the main body A by the introduction of auxiliary, but smaller, reinforcing rods, and in order to accomplish this object I form the rod-retaining bodies C with auxiliary loops 10, (and in Figs. 6 and 20 I have shown such a construction in detail,) and locate in these auxiliary loops auxiliary rods F. In this manner the main body A is so much strengthened that it may be worn down until the auxiliary rods have been entirely worn away, and still retain its solidity by the remaining main rods E.

The attaching lugs D are preferably made from a sheet-metal stamping and of rectangular contour, and having the usual apertures 12 as shown, but malleable iron or steel castings may be resorted to if desired, and such an attaching lug D is passed through the aperture 5 in the plate B and projects into the body A a sufficient distance to be firmly anchored therein.

I now desire to call attention to the fact that in producing this brake-shoe I may avail myself of all the well-known expedients which time has developed in brake-shoe construction. Thus the main body may be made of soft, or of hard, iron, or partly of soft and partly of hard iron, or it may have chilled spots or portions to produce wearing surfaces having different degrees of hardness. So may I form recesses in the rubbing surfaces of the main body and insert therein bodies having different wearing properties, and I may recess the wearing face of the brake-shoe near the flange-portion where the wear of the rails upon the car-wheels is such as to form grooves and shoulders in the tread of the wheel, all such, more or less modern, means for producing an effective brake-shoe being applicable in my present construction.

It is evident that the plate, the rod-retaining bodies, and the rods will be made from a ductile metal having sufficient tensile strength and an ample coefficient of elongation and elasticity to prevent rupture when the brake-shoe is put to actual, and necessary severe, use.

I have heretofore described the preferred form of construction of the plate B, that is to say: producing the same with the depressions 2, so that the rod-retaining bodies may be flush, or approximately flush, with the outer surface of said plate B. This construction I may, however, vary by dispensing with these depressions, or not make them deep enough for the rod-retaining bodies to be flush with the outer surface of the plate B. Such a modification of the plate is shown in Fig. 14, and is clearly within the scope of my invention.

Having thus described my invention, I claim as new and desire to secure to me by Letters Patent of the United States—

1. A reinforced brake-shoe consisting of a main body; a plate on the back of said main body, there being a series of apertures in said plate as described; a series of rod-retaining bodies passed into said apertures, and reinforcing rods in said rod-retaining bodies; said rod-retaining bodies having reëntering lugs, as stated.

2. In a reinforced brake-shoe, a main body; a plate on the back of said main body, there being a series of apertures in said plate as described; a series of rod-retaining bodies passed into said apertures, and reinforcing rods in said rod-retaining bodies; said rod-retaining bodies having reëntering lugs and auxiliary anchors, as stated.

3. In a reinforced brake-shoe, a main body; a plate on the back of said main body, there being a series of apertures in said plate as described; a series of rod-retaining bodies passed into said apertures, there being reëntering lugs on said rod-retaining bodies and auxiliary loops thereon; and a series of reinforcing rods in said rod-retaining bodies, as set forth.

4. In a reinforced brake-shoe, a main body; a plate on the back of said main body, there being a series of apertures in said plate as described; a series of rod-retaining bodies having reëntering lugs located in said plate and the main body; a series of reinforcing rods in said rod-retaining bodies, and a series of auxiliary rods in said main body.

5. In a reinforced brake-shoe, a main body; a plate on the back of said main body, there being a series of apertures in said plate as described; a series of rod-retaining bodies having reëntering lugs as described passed into said apertures; a series of reinforcing rods in said rod-retaining bodies, said rod-retaining bodies being provided with auxiliary loops; and auxiliary reinforcing rods in said auxiliary loops, as stated.

6. In a reinforced brake-shoe, a main body; a plate on the back of said main body, there being a series of apertures in said plate as described; a series of rod-retaining bodies in said plate and the main body; reëntering lugs on said rod-retaining bodies, and a series of reinforcing rods in said rod-retaining bodies; said rod-retaining bodies being provided with auxiliary anchors and auxiliary loops, as set forth.

7. In a reinforced brake-shoe, a main body; a plate on the back of said main body, there being a series of apertures in said plate as described; a series of rod-retaining bodies in said plate and the main body; reëntering lugs on said rod-retaining bodies; a series of reinforcing rods in said rod-retaining bodies, said rod-retaining bodies being provided with auxiliary anchors, and auxiliary rods in said main body.

8. In a reinforced brake-shoe, a main body; a plate on the back of said main body, there being a series of apertures in said plate as described; a series of rod-retaining bodies in said plate and the main body; reëntering lugs on said rod-retaining bodies; a series of reinforcing rods in said rod-retaining bodies, said rod-retaining bodies being provided with auxiliary anchors; auxiliary loops on said rod-retaining bodies, and reinforcing rods in said auxiliary loops, as set forth.

9. In a reinforced brake-shoe, a main body; a plate on the back of said main body, there being a series of depressions in said plate and apertures in said depressions; a series of rod-retaining bodies in said apertures and the main body, and a series of reinforcing rods in said rod-retaining bodies, said rod-retaining bodies having reëntering lugs as specified.

10. In a reinforced brake-shoe, a main body; a plate on the back of said main body, there being a series of depressions in said plate and apertures in said depressions; a series of rod-retaining bodies in said apertures and the main body, and a series of reinforcing rods in said rod-retaining bodies, said rod-retaining bodies having reëntering lugs and auxiliary anchors as stated.

11. In a reinforced brake-shoe, a main body; a plate on the back of said main body, there being a series of depressions in said plate and apertures in said depressions; a series of rod-retaining bodies in said apertures and the main body, and a series of reinforcing rods in said rod-retaining bodies, said rod-retaining bodies having reëntering lugs and auxiliary anchors, as stated.

12. In a reinforced brake-shoe, a main body; a plate on the back of said main body, there being a series of depressions in said plate and apertures in said depression; a series of rod-retaining bodies in said apertures and the main body, said rod-retaining bodies having reëntering lugs as described; a series of reinforcing rods in said rod-retaining bodies, and a series of auxiliary reinforcing rods in said main body, as specified.

13. In a reinforced brake-shoe, a main body; a plate on the back of said main body, there being a series of depressions in said plate and apertures in said depressions; a series of rod-retaining bodies in said apertures and the main body, said rod-retaining bodies having reëntering lugs and auxiliary loops; a series of reinforcing rods in said rod-retaining bodies, and a series of auxiliary rods in said auxiliary loops, as stated.

14. In a reinforced brake-shoe, a main body; a plate on the back of said main body, there being a series of depressions in said plate and a series of apertures in said depressions; a series of rod-retaining bodies in said apertures and the main body, having reëntering lugs, auxiliary anchors and auxiliary loops formed integral with the main loop; a series of reinforcing rods in said main loop, and a series of reinforcing rods in the auxiliary loops, as stated.

15. In a reinforced brake-shoe, a main body; a plate on the back of said main body, there being a series of depressions in said plate and a series of apertures in said depression; a series of rod-retaining bodies in said apertures and the main body having reëntering lugs and auxiliary anchors as described, and auxiliary loops all formed integral with the main loop; a series of reinforcing rods in said main loop; and a series of auxiliary reinforcing rods in said main body, as set forth.

16. In a reinforced brake-shoe, a main body; a plate on the back of said main body, there being a series of depressions in said plate and a series of apertures in said depressions; a series of rod-retaining bodies in said apertures and the main body having reëntering lugs and auxiliary anchors on said lugs and auxiliary loops, all formed integral with the main loop; a series of reinforcing rods in said main loops and a series of auxiliary rods in the auxiliary loops, as mentioned.

17. In a reinforced brake-shoe, a main body; a plate on the back of the main body, there being a series of apertures in said plate as described; a series of rod-retaining bodies in said apertures and the main body; reinforcing rods in said rod-retaining bodies, and an attaching-lug projecting from said plate and entering and anchored in said main body; there being reëntering-lugs on said rod-retaining bodies anchored in said main body, as stated.

18. In a reinforced brake-shoe, a main body; a plate on the back of said main body, there being a series of apertures in said plate as described; a series of rod-retaining bodies in said main body and the plate; reinforcing rods in said rod-retaining bodies and an attaching-lug projecting from said plate and entering and anchored in said main body, there being reëntering lugs on said rod-retaining bodies and auxiliary anchors on said lugs, as described.

19. In a reinforced brake-shoe, a main body; a plate on the back of said main body, there being a series of apertures in said plate as described; a series of rod-retaining bodies in said plate and the main body; reinforcing rods in said rod-retaining bodies; and an attaching-lug projecting from the back of said plate and entering in part, and being anchored in said main body; there being reëntering lugs on said rod-retaining bodies and auxiliary loops thereon, the whole being formed into a homogeneous body by the main body being cast onto the assembled reinforcing parts.

20. In a reinforced brake-shoe, a main body; a plate on the back of said main body, there being a series of apertures in said plate as described; a series of rod-retaining bodies in said apertures and the main body; reinforcing rods in said rod-retaining bodies; and an attaching lug projecting from the back of said plate and entering, in part, and being anchored in said main body; there being reëntering lugs on said rod-retaining bodies and auxiliary rods in said main body, the whole being formed into a homogeneous body by the main body being cast onto the assembled reinforcing parts, as set forth.

21. In a reinforced brake-shoe, a main body; a plate on the back of said main body, there being a series of apertures in said plate as described; a series of rod-retaining bodies in said apertures and the main body; reinforcing rods in said rod-retaining bodies; and an attaching lug projecting from the back of said plate and entering, in part, and being anchored in said main body; there being reëntering lugs on said rod-retaining bodies and auxiliary loops thereon, said lugs and the auxiliary loops being formed integral with the main loops; and auxiliary reinforcing rods in said auxiliary loops, the whole being formed into a homogeneous body by the main body being cast onto the assembled reinforcing parts, as set forth.

22. In a reinforced brake-shoe, a main body; a plate on the back of said main body, there being a series of apertures in said plate as described; a series of rod-retaining bodies in said apertures and the main body; reinforcing rods in said rod-retaining bodies; and an attaching lug projecting from the back of said plate and passing, in part, through said plate into, and being anchored in said main body; there being reëntering lugs, auxiliary anchors, and auxiliary loops on said rod-retaining bodies which are formed integral with the main loop thereof, the whole being formed into a homogeneous body by the main body being cast onto the assembled reinforcing parts, as stated.

23. In a reinforced brake-shoe, a main body; a plate on the back of said main body, there being a series of apertures in said plate; as described; a series of rod-retaining bodies in said apertures and the main body; reinforcing rods in said rod-retaining bodies; and an attaching lug projecting from the back of said plate and passing, in part, through said plate into, and being anchored in said main body; there being reëntering lugs and auxiliary anchors on said rod-retaining bodies formed integral with the main loop thereof, and auxiliary reinforcing rods in said main body, the whole being formed into a homogeneous body by the main body being cast onto the assembled reinforcing parts, as set forth.

24. In a reinforced brake-shoe, a main body; a plate on the back of said main body, there being a series of apertures in said plate as described; a series of rod-retaining bodies in said apertures and the main body; reinforcing rods in said rod-retaining bodies; and an attaching lug projecting from the back of said plate and passing, in part, through said plate into, and being anchored in said main body; there being reëntering lugs, auxiliary anchors and auxiliary loops on said rod-retaining bodies and formed integral with the main loop; and auxiliary reinforcing rods in said auxiliary loops, the whole being formed into a homogeneous body by the main body being cast onto the assembled reinforcing parts, as specified.

25. In a reinforced brake-shoe, a main body; a plate on the back of said main body, there being a series of depressions in said plate and a series of apertures in said depressions as described; a series of rod-retaining bodies in said apertures and the main body; reinforcing rods in said rod-retaining bodies; and an attaching lug projecting from the back of said plate and passing, in part, through said plate into, and being anchored in said main body, there being reëntering lugs on said rod-retaining bodies anchored in said main body, as specified.

26. In a reinforced brake-shoe, a main body; a plate on the back of said main body, there being a series of depressions on said plate and a series of apertures in said depressions as described; a series of rod-retaining bodies in said apertures and the main body; reinforcing rods in said rod-retaining bodies; and an attaching lug projecting from the back of said plate and passing, in part, through said plate into, and being anchored in said main body; there being reëntering lugs on said rod-retaining bodies and auxiliary anchors on said lugs, said reëntering lugs and auxiliary anchors being formed integral with the main loop; the whole being formed into a homogeneous body by the main body being cast onto the assembled reinforcing parts, as specified.

27. In a reinforced brake-shoe, a main body, a plate on the back of said main body, there being a series of depressions in said plate and a series of apertures in said depressions; a series of rod-retaining bodies in said plate and the main body; reinforcing rods in said rod-retaining bodies; and an attaching lug projecting from the back of said plate and entering, in part, and being anchored in said main body; there being reëntering lugs on said rod-retaining bodies, and auxiliary loops thereon, the whole being formed into a homogeneous body by the main body being cast onto the assembled reinforcing parts, as stated.

28. In a reinforced brake-shoe, a main body; a plate on the back of said main body, there being a series of depressions in said plate and a series of apertures in said depressions; a series of rod-retaining bodies in said apertures and the main body; reinforcing rods in said rod-retaining bodies; and an attaching lug projecting from the back of said plate and passing, in part, through said plate into and being anchored in said main body; there being reëntering lugs on said rod-retaining bodies and auxiliary rods in said main body, the whole being formed into a homogeneous body by the main body being cast onto the assembled reinforcing parts, as specified.

29. In a reinforced brake-shoe, a main body; a plate on the back of said main body, there being a series of depressions in said plate and a series of apertures in said depressions; a series of rod-retaining bodies in said apertures and the main body; reinforcing rods in said rod-retaining bodies; and an attaching lug projecting from the back of said plate and passing, in part, through said plate into and being anchored in said main body; there being reëntering lugs on said rod-retaining bodies and auxiliary loops thereon said lugs and auxiliary loops being formed integral with the main loop; and auxiliary reinforcing rods in said auxiliary loops, the whole being formed into a homogeneous body by the main body being cast onto the assembled reinforcing parts, as stated.

30. In a reinforced brake-shoe, a main body; a plate on the back of said main body, there being a series of depressions in said plate and a series of apertures in said depressions as described; a series of rod-retaining bodies in said rod-retaining bodies, and an attaching lug projecting from the back of said plate and passing, in part, through said plate into and being anchored in said main body; there being reëntering lugs auxiliary anchors, and auxiliary loops on said rod-retaining bodies which are formed integral with the main loop thereof; the whole being formed into a homogeneous body by the main body being cast onto the assembled reinforcing parts, as set forth.

31. In a reinforced brake-shoe, a main body; a plate on the back of said main body, there being a series of depressions in said plate and a series of apertures in said depressions, as described; a series of rod-retaining bodies in said apertures and the main body; reinforcing rods in said rod-retaining bodies; and an attaching lug projecting from the back of said plate and passing, in part, through said plate into and being anchored in said main body; there being reëntering lugs and auxiliary anchors on said rod-retaining bodies formed integral with the main loop thereof; and auxiliary reinforcing rods in said main body; the whole being formed into a homogeneous body by the main body being cast onto the assembled reinforcing parts as specified.

32. In a reinforced brake-shoe, a main body; a series of depressions in, and in combination with, a plate on the back of said main body, there being a series of apertures in said depressions as described; a series of rod-retaining bodies in said apertures and the main body; reinforcing rods in said rod-retaining bodies; and an attaching lug projecting from the back of said plate and passing, in part, through said plate into and being anchored in said main body; there being reentering lugs, auxiliary anchors, and auxiliary loops on said rod-retaining bodies and formed integral with the main loop; and auxiliary reinforcing rods in said auxiliary loops, the whole being formed into a homogeneous body by the main body being cast onto the assembled reinforcing parts, as specified.

In testimony that I claim the foregoing as my invention I have hereunto set my hand in the presence of two subscribing witnesses.

WILLIAM O. STARK.

Attest:
MICHAEL J. STARK,
C. KNUDSEN.